United States Patent [19]
Wright et al.

[11] Patent Number: 5,443,438
[45] Date of Patent: Aug. 22, 1995

[54] CENTRIFUGE DRIVE-TO-ROTOR ASSEMBLY

[75] Inventors: Herschel E. Wright, Gilroy; Cory Y. Chern, Mountain View, both of Calif.

[73] Assignee: Beckman Instruments, Inc., Fullerton, Calif.

[21] Appl. No.: 282,707

[22] Filed: Jul. 29, 1994

[51] Int. Cl.$^6$ ............................................. B04B 9/00
[52] U.S. Cl. ................................... 494/84; 494/16; 464/87
[58] Field of Search .............. 494/16, 20, 84, 85; 464/51, 87; 403/365, 372

[56] References Cited

U.S. PATENT DOCUMENTS

| | | | |
|---|---|---|---|
| 3,938,354 | 2/1976 | Lehman | 494/85 |
| 4,464,161 | 8/1984 | Uchida | 494/16 |
| 4,857,811 | 8/1989 | Barrett et al. | 318/3 |
| 5,084,133 | 1/1992 | Guy et al. | 159/47.1 |
| 5,342,282 | 8/1994 | Letourneur | 494/16 |

FOREIGN PATENT DOCUMENTS 2501513 7/1976 Germany .................. 494/84

Primary Examiner—David A. Scherbel
Assistant Examiner—Randall E. Chin
Attorney, Agent, or Firm—William H. May; Gary T. Hampson; Terry McHugh

[57] ABSTRACT

An assembly for transferring rotation from a centrifuge drive system to a centrifuge rotor includes a hub that is connected to the drive system for rotation about an axis. A sleeve member is attached to the hub in a position to support the centrifuge rotor. The sleeve member is formed of a material having a low coefficient of friction and is positioned to reduce the likelihood of rotor-to-hub lock. The resistance of the sleeve member to wear and to the absorption of foreign matter are also important in the selection of a material for forming the sleeve member. An acetal-based compound is preferred. By connecting the sleeve member to the hub such that the exterior surface of the sleeve member is raised relative to the surface of the hub, rotor-to-hub contact is reduced, thereby further reducing the risk that the rotor and the hub will become locked to one another.

16 Claims, 2 Drawing Sheets

CENTRIFUGE DRIVE-TO-ROTOR ASSEMBLY

TECHNICAL FIELD

The present invention relates generally to centrifuges and more particularly to assemblies for translating torque from a drive shaft to a centrifuge rotor.

BACKGROUND ART

Centrifuge equipment may be used to separate a biological or chemical sample into sample components based upon differences in molecular weight. The availability of a variety of types of centrifuge rotors increases the versatility of the equipment in biological and chemical experimental research. For a selected separation process, a rotor model is selected according to the sample of interest and the physical characteristics of the rotor.

The centrifuge must be adapted to interchangeably mount any of a variety of models of rotors onto a rotational drive shaft. Conventionally, a centrifuge rotor is connected to the drive system by a metal hub. The hub is fixed to a drive shaft of the drive system and is releasably coupled to the rotor to transmit torque power from the drive shaft to the rotor. The hub may have one or more prongs that project upwardly in parallel relationship with the drive shaft from the top of the hub. Each rotor includes structure for mating with the prongs of the hub. Typically, the rotor slides onto the hub.

A difficulty that has been encountered is that while a rotor will freely slide onto a hub, the rotor becomes fastened to the hub following the centrifuge process. As the rotor is spun, the physical characteristics of one or both of the hub and the rotor change, so that the hub becomes locked to the rotor. One possible explanation for this phenomenon is that the centrifugal force causes the rotor to expand to a greater degree than the hub. A rotor may be aluminum, while the hub is formed of stainless steel. Often, the rotor is supported on a sloped surface of the hub. The theory is that the differential in expansions allows the rotor to descend as the assembly is spun. Then, when the rotor is brought to rest, the rotor and the hub return to their original dimensions. However, the geometries of the hub and the rotor are such that the rotor does not ascend to the original position relative to the hub. As a result, the rotor clamps onto the hub.

Because the fastening members for connecting the hub to the drive shaft are typically not accessible when a rotor is supported on the hub, rotor-to-hub lock may result in the need to replace an entire centrifuge drive system. At the least, the rotor must be discarded if the rotor cannot be detached from the hub. Thus, there is a substantial cost involved. As centrifuge systems increase in their capability to rotate biological and chemical samples at higher speeds, the potential of rotor-to-hub lock increases.

Attempts have been made to coat the hub with the synthetic resin polymer sold by E. I. DuPont Company under the trademark TEFLON. However, the coating is susceptible to scratches and deterioration. Replacement of the coating is expensive.

It is an object of the present invention to provide an assembly for releasably connecting a centrifuge rotor to a centrifuge drive system, with decreased susceptibility to rotor-to-drive lock.

SUMMARY OF THE INVENTION

The above object has been met by an assembly in which a hub is connected to a centrifuge drive system and is modified to include a sleeve member having a coefficient of friction that is less than that of the hub. In a preferred embodiment, the sleeve member is fixed within a recessed region of the hub, but extends beyond the recess to present a raised surface for supporting a centrifuge rotor.

The hub may be integral with a drive shaft, but typically is a separate member that is fixed in axial relationship to the drive shaft. For example, set screws may be used to fix the hub to the drive shaft. The hub of a centrifuge is conventionally formed of stainless steel.

The sleeve member is coaxially fixed to the hub in a position in which interchangeable centrifuge rotors will come into contact with the sleeve member, so as to reduce rotor-to-hub friction. A centrifuge rotor is typically formed of aluminum, but this is not critical to the invention. Important to the invention is that the sleeve member have a low coefficient of friction, so that the susceptibility of centrifuge parts being locked together is significantly reduced. In a preferred embodiment, the sleeve member is formed of an acetal-based compound and is ideally the acetal product sold by Polymer Corporation under the trademark ACETRON GP.

In addition to the coefficient of friction, other characteristics of the sleeve member are a concern. The material should be one that is resistant to absorption of foreign matter, i.e. "porosity-free." Resistance to the introduction of dust and other foreign matter aids in maintaining the sleeve member as a means for preventing the rotor from sticking to the hub. The material for forming the sleeve member should also have good bearing characteristics and should be resistant to abrasions.

An advantage of the sleeve member is that the likelihood of rotor-to-hub lock is significantly reduced in a cost-efficient manner. Another advantage is that the sleeve member is more easily replaced than alternative solutions, such as coating the hub. If replacement is required, a razor may be used to cut away the original sleeve member, and a new sleeve member may be snap-fit onto the hub.

BEST MODE FOR CARRYING OUT THE INVENTION

Figure 1:
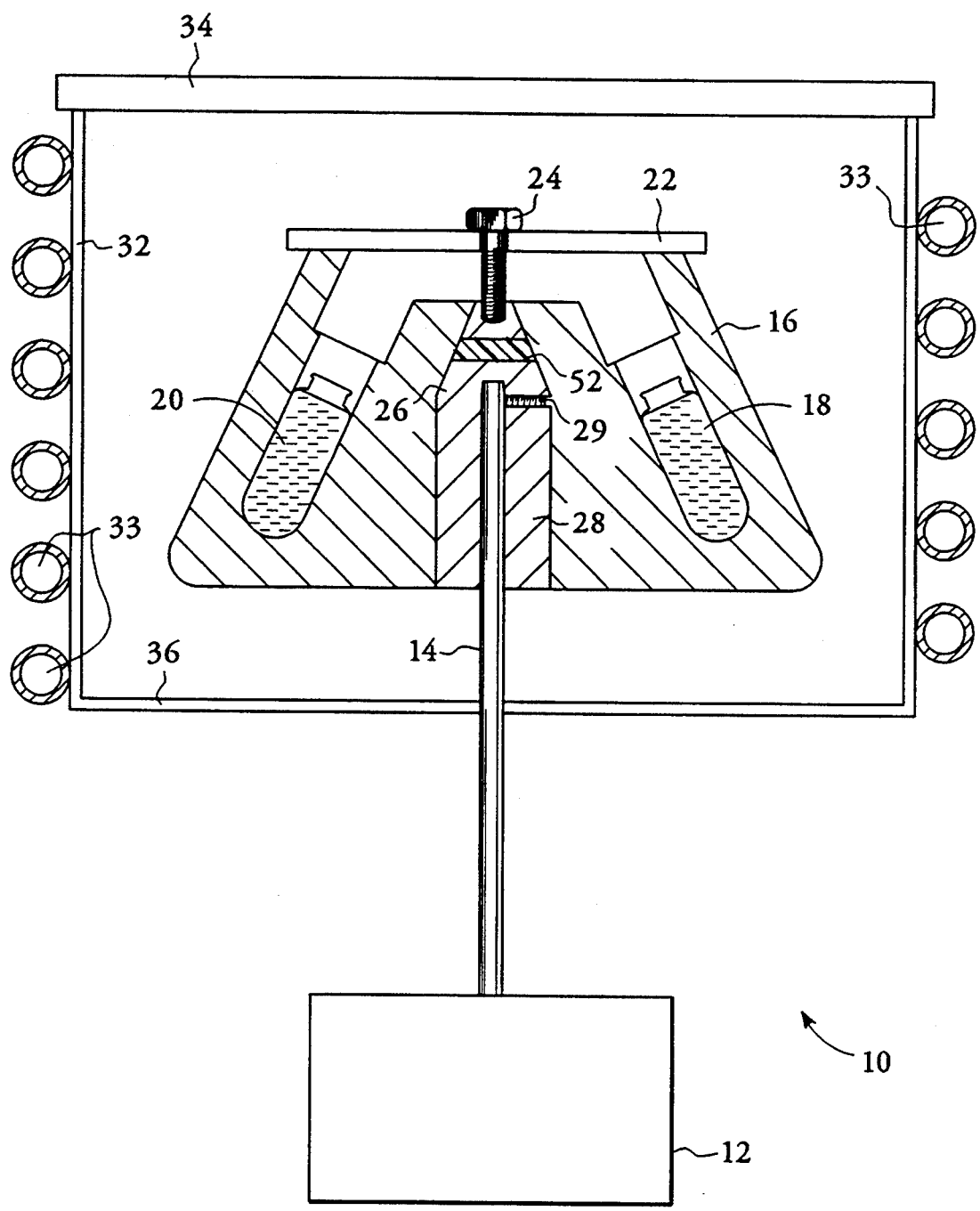
FIG. 1 is a side sectional view of a centrifuge system in accordance with the invention.

With reference to FIG. 1, a centrifuge 10 includes a drive motor 12 for rotating a drive shaft 14. While not critical, the drive motor may be a switched reluctance motor for rotating the drive shaft at a high rate of speed.

A rotor 16 is shown as having compartments for securing at least two specimen containers 18 and 20 for the centrifugal separation of specimen components. The containers 18 and 20 are placed in the rotor by removing a rotor lid 22. A locking knob 24 includes an externally-threaded portion that extends through a hole in the rotor lid and that is received within an internally-threaded bore of a hub 26. The locking knob secures the rotor lid 22 to the rotor 16 and secures the rotor to the hub. As will be explained more fully below, typically the hub contains structure, such as upwardly extending prongs, which provides proper transfer of torque from the hub to the rotor.

The hub 26 includes a cylindrical lower portion 28 that receives the drive shaft 14. A set screw 29 fixes the hub to the drive shaft, thereby ensuring that the drive motor 12 spins the hub and the rotor 16. Typically, there are six set screws that couple the hub to the drive shaft.

The rotor 16, the hub 26 and the upper portion of the drive shaft 14 are contained within a chamber defined by a housing 32 having a cover 34. While not shown, typically vacuum seals are located at the interface of the cover with the remainder of the housing, and a vacuum pump is connected to the housing to control vacuum pressure within the chamber. The side walls and the bottom wall 36 of the housing may be a metallic framework having refrigeration coils 33 at exterior surfaces in order to control the temperature within the enclosed chamber defined by the housing.

Figure 2:
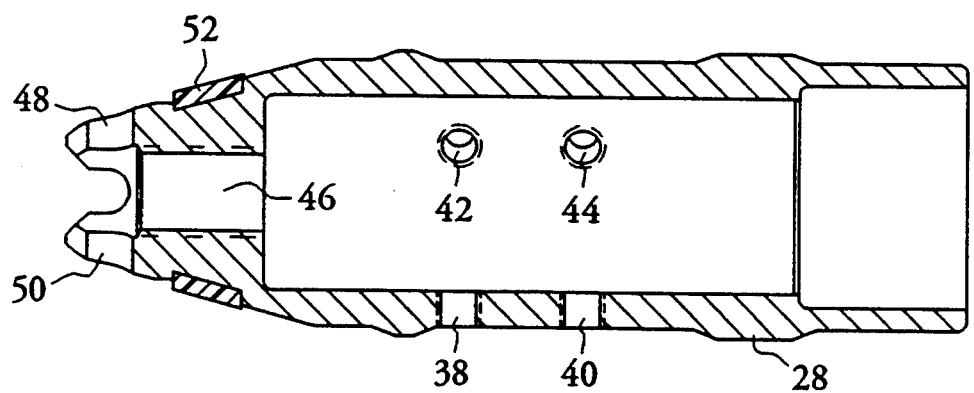
FIG. 2 is a side sectional view of a sleeve member and a hub of FIG. 1.

The hub 26 is shown schematically in FIG. 1. A more accurate representation is shown in FIG. 2. The hub is a stainless steel member, but this is not critical. Four bores 38, 40, 42 and 44 are shown. Dashed lines adjacent to the bores are included to represent internal threads to receive externally-threaded set screws 29 that secure the hub to the drive shaft 14. Bores 38 and 40 are 120° from bores 42 and 44. A third pair of bores, not shown, is 120° from each of the two pairs shown in FIG. 2.

At the top end of the hub 26 is a large, internally-threaded bore 46. The bore 46 is dimensioned to receive the externally-threaded portion of the locking knob 24, thereby securing the rotor 16 to the hub 26. A pair of prongs 48 and 50 is used to transmit torque from the hub to the rotor. The rotor may include one or more downwardly-depending prongs that fit between the hub prongs 48 and 50. Alternatively, the rotor may have openings into which the hub prongs slide when the rotor is joined to the hub. Other techniques for properly connecting the hub to the rotor may also be used.

As previously noted, the hub 26 may be formed of stainless steel. On the other hand, a rotor 16 is typically formed of aluminum. When the drive motor 12 spins the hub and the rotor, physical changes occur that may cause the rotor to stick to the hub. One theory is that differences in the densities, maximum radii, and the coefficients of thermal expansion between stainless steel and aluminum cause the rotor to expand more than the spinning hub. Because of the difference in expansions, the rotor will slide downwardly along the frustroconically-shaped upper region of the hub. When the hub and rotor are allowed to relax, the repositioning of the rotor causes the rotor to grip the hub. However, the structure of FIGS. 1 and 2 includes a sleeve member 52 that is designed to prevent rotor-to-hub lock.

Referring now to FIGS. 1-4, the sleeve member 52 is a hollow truncated conical member having frustroconical interior and exterior surfaces 54 and 56, respectively. Each of the surfaces 54 and 56 is at a 15° angle relative to the axis of the sleeve member. The length of the sleeve member shown in FIGS. 1-4 is 0.305 inch (7.747 mm), the measurement being taken in a direction that is parallel to the axis of the sleeve member. The thickness is approximately 0.065 inch (1.651 mm)

Figure 3:
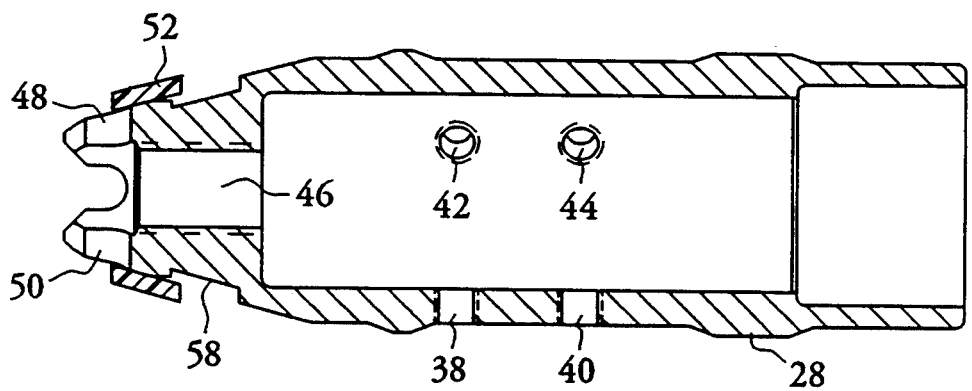
FIG. 3 is a side sectional view of the hub of FIG. 2, with the sleeve member in the process of being snap-fit into place on the hub.
Figure 4:
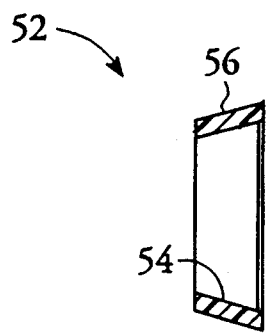
FIG. 4 is a side sectional view of the sleeve member of FIGS. 1-3.

As best seen in FIG. 3, the sleeve member 52 is received within an annular recessed portion 58 of the hub 26. The slope of the recessed portion matches the slope of the internal surface 54 of the sleeve member. Preferably, the recess in the hub 26 has a depth which causes the sleeve member to extend beyond the recessed portion. In FIG. 2, the sleeve member 52 presents a surface that is raised relative to the surface regions that are immediately adjacent to the sleeve member. For example, the exterior surface of the sleeve member may be raised by 0.005 inch (0.127 mm).

When the sleeve member 52 is raised relative to the immediately adjacent surface regions of the hub 26, a rotor 16 will come to rest upon the sleeve member, rather than being supported along a sloped surface of the hub 26. The sleeve member is formed of a material having a low coefficient of friction. The low friction surface of the sleeve member encourages a sliding action between the contacting surfaces of the sleeve member and the rotor. Thus, although the rotor may continue to exhibit a downwardly sliding motion along the hub while spinning, the rotor is less likely to grip the hub when the rotor is allowed to relax as it comes to a rest. Consequently, a rotor is less likely to become locked to the hub 26. Preferably, the sleeve member is a polymeric member. Acetal-based compounds offer many advantages, with the acetal product sold by Polymer Corporation under the trademark ACETRON GP appearing to offer the best combination of mechanical properties and cost. ACETRON GP is identified as having a static coefficient of friction in the range of 0.12 to 0.28 and having a dynamic coefficient of friction in the range of 0.15 to 0.35.

The selected material for forming the sleeve member 52 should also have a high "manufacturing stability," i.e. should be one which facilitates dimensional repeatability in the manufacture of a number of units of sleeve members. The synthetic polymer sold by E. I. DuPont Company under the federally-registered trademark TEFLON is a good substitute with regard to coefficient of friction, but has a lower manufacturing stability and is more expensive.

Another desired property of the sleeve member 52 is resistivity to introduction of foreign matter into the member. That is, the sleeve member should be relatively porosity-free. The material for forming the sleeve member should also have a high resistance to wear. Nevertheless, the sleeve member is snap-fit into the recessed portion 58 of the hub 26, so that the sleeve member can be periodically replaced, if desired.

In operation, the drive motor 12 rotates the hub 26 and the rotor 16. While the hub and rotor may undergo physical and/or geometric changes as a result of the rotation, the polymeric sleeve member 52 acts to prevent the rotor from being locked to the hub following a centrifuge run. As previously noted, preferably the sleeve member is raised relative to the surface of the hub, so as to minimize metal-to-metal contact of the rotor to the hub. However, this is not critical.

While the hub 26 is shown as being structurally separate from the drive shaft 14, the hub and the drive shaft can be a unitary structure. In such an embodiment, the sleeve member is attached directly to the drive shaft. While not shown, the polymeric sleeve member may be affixed to the rotor 16, rather than the hub. However, this requires each rotor to be fitted with a sleeve member.

We claim:

1. An assembly for transferring rotation from a centrifuge drive system to a centrifuge rotor comprising:
   a hub connected to be driven by said centrifuge drive system, said hub having means for translating rotational motion to said centrifuge rotor, said hub being formed of a material having a first coefficient of friction; and
   a sleeve member attached to said hub in a position to support said centrifuge rotor, said sleeve member being formed of a material having a second coefficient of friction that is less than said first coefficient of friction.

2. The assembly of claim 1 wherein said sleeve member has an exterior surface having a truncated conical configuration, said sleeve member having an interior surface in contact with said hub.

3. The assembly of claim 1 wherein said sleeve member is formed of an acetal-based compound.

4. The assembly of claim 1 wherein said hub and said sleeve member are generally coaxial and each has a peripheral surface, said peripheral surface of said hub having a recessed region in which said sleeve member is fit, said sleeve member extending radially beyond said recessed region such that said centrifuge rotor rests upon said sleeve member and is substantially out of contact with said peripheral surface of said hub.

5. The assembly of claim 1 wherein said hub has an interior surface configured to receive a drive shaft of said centrifuge drive system.

6. The assembly of claim 1 wherein said hub is stainless steel and said sleeve member is a substantially porosity-free polymer.

7. The assembly of claim 1 wherein said sleeve member is snap-fit to said hub.

8. A member for supporting a centrifuge rotor that is coupled to a drive member for rotation about a drive axis comprising:
   a hub having an axis substantially coincident with said drive axis and having exterior surface regions; and
   a polymeric sleeve coupled to said hub, said polymeric sleeve having an axis substantially coincident with said axis of said hub, said polymeric sleeve having a lower coefficient of friction than a coefficient of friction of said hub, said polymeric sleeve having opposed axial sides and extending radially beyond said exterior surface regions of said hub that are adjacent to said opposed axial sides, thereby positioning said polymeric sleeve such that said centrifuge rotor contacts said polymeric sleeve in spaced relation to said exterior surface regions of said hub.

9. The member of claim 8 wherein said polymeric sleeve has a peripheral surface having a truncated conical surface.

10. The member of claim 9 wherein said polymeric sleeve is snap-fit to said hub, said polymeric sleeve having a frustroconically shaped interior surface contacting said hub.

11. The member of claim 8 wherein said hub includes a recessed region into which said polymeric sleeve is secured.

12. The member of claim 8 wherein said polymeric sleeve is formed of an acetal-based compound.

13. A centrifuge system comprising:
   a drive shaft having a rotational axis;
   a hub connected to said drive shaft for rotation about said rotational axis, said hub having a ring-shaped recessed region coaxial with said drive shaft;
   a sleeve located within said recessed region, said sleeve having a frustroconically shaped outer surface, said sleeve being formed of a material having a lower coefficient of friction than the coefficient of friction of said hub; and
   a centrifuge rotor connected to said hub for rotation therewith, said centrifuge rotor being supported by said sleeve.

14. The system of claim 13 wherein said sleeve is a polymeric member snap-fit onto said hub.

15. The system of claim 14 wherein said polymeric member is formed of a material which is resistant to absorption of foreign matter.

16. The system of claim 13 wherein said hub has surface regions adjacent to said recessed region, and said outer surface of said sleeve is raised relative to said surface regions.

* * * * *